United States Patent [19]

Backwinkel et al.

[11] 3,800,229

[45] Mar. 26, 1974

[54] GAIN CONTROLLED HIGH-FREQUENCY INPUT STAGE HAVING A PIN-DIODE NETWORK

[75] Inventors: Johannes Backwinkel; Eckhardt Greyer, both of Hildesheim, Germany

[73] Assignee: Blaupunkt-Werke GmbH, Hildesheim, Germany

[22] Filed: May 24, 1972

[21] Appl. No.: 256,596

[30] Foreign Application Priority Data

May 26, 1971 Germany ........................... 2126136

[52] U.S. Cl. ................. 325/381, 325/408, 325/414, 333/81 R

[51] Int. Cl. ............................................. H04b 1/28

[58] Field of Search ........... 325/319, 376, 381, 387, 325/400, 408, 411, 414; 333/81 R

[56] References Cited

UNITED STATES PATENTS

| | | | |
|---|---|---|---|
| 3,624,561 | 11/1971 | Tongue | 333/81 R |
| 3,619,786 | 11/1971 | Wilcox | 325/411 |

*Primary Examiner*—Robert L. Richardson
*Assistant Examiner*—Jin F. Ng
*Attorney, Agent, or Firm*—Flynn & Frishauf

[57] ABSTRACT

To decrease cross modulation in strong signal areas in TV tuners, a PIN-diode network is connected to the automatic gain control voltage and to a source, the PIN-diode network being connected with the d-c circuit of a pre-amplifier transistor in such a manner that the reference voltage for the PIN-diode network is stabilized by the transistor itself, derived from the emitter of the high-frequency, high-current transistor.

8 Claims, 2 Drawing Figures

GAIN CONTROLLED HIGH-FREQUENCY INPUT STAGE HAVING A PIN-DIODE NETWORK

Figures 1, 2:
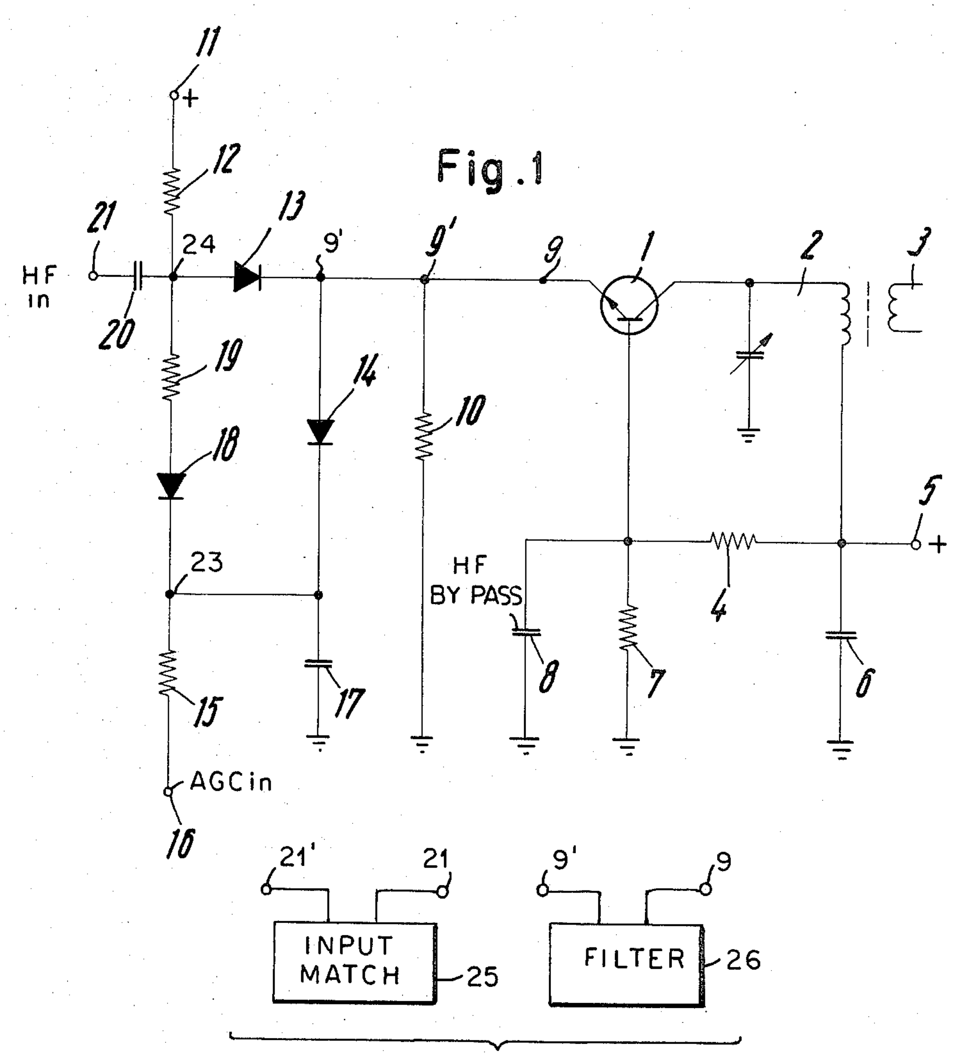

The present invention relates to a gain controlled high-frequency input stage particularly for television receivers, and especially for tuners in television receivers in which the RF input voltage is controlled by a PIN-diode network, and including a pre-amplifier, high-current transistor.

It has previously been proposed to control the input stages of television tuners in such a manner that overloading in high-strength signal areas is avoided. When utilizing controlled pre-amplifier transistors, difficulties have been experienced since these transistors are subject to cross modulation, apparently due to their strongly curved characteristics of but little range. Circuits have been proposed in which a controlled PIN-diode network is connected to the input between the antenna and the pre-amplifier transistor. Such controlled networks require a stabilized reference voltage when is capable of accepting current, as well as of delivering current. Stabilized reference sources of this type require additional circuit components, such as at least one Zener diode, and possibly also a transistor, or a transistor alone, or a voltage divider having a heavy normal quiescent current, that is, a current flowing through the voltage divider components which is large in comparison to the desired reference current.

It is an object of the present invention to provide a circuit for a controllable RF input stage for TV tuners, which is linearly responsive to large signal conditions and which does not require expensive additional components, or place a current drain on the supply of the receiver, which additionally results in heat which must be dissipated.

Subject matter of the present invention:

Briefly, a controlled PIN-diode network is connected in the d-c circuit of the pre-amplifier transistor. The pre-amplifier transistor is high-current transistor in an unregulated supply circuit, which is so connected that a stabilized reference voltage for the PIN-diode network is derived from the emitter of the transistor itself.

The advantage of the present circuit is that optimum large signal capability, and resistance to cross modulating distortion is obtained, without requiring a separate or independent stabilized reference current source. This is obtained by incorporating the PIN-diode network in the d-c circuit of the pre-amplifier transistor.

The invention will be described by way of example with reference to the accompanying drawings, wherein:

FIG. 1 is a highly schematic general diagram of the circuit in accordance with the present invention; and FIG. 2 is a fragmentary diagram illustrating a modification of the diagram of FIG. 1.

The pre-amplifier transistor 1 is an npn high-current transistor, having a tuned circuit 2 connected to its collector. Tuned circuit 2 has a further coupling coil 3 inductively coupled thereto for further coupling to the RF circuit of the TV receiver. The base of transistor 1 is connected over a resistor 4 with terminal 5 of a positive source of voltage. Connection terminal 5 is further bypassed to ground or chassis by a condenser 6, and connected to the inductance of the tuned circuit 2. The base of transistor 1 is further connected to chassis over a resistor 7 and over a capacitor 8, forming an HF bypass, in parallel to resistor 7. Condenser 8 effectively places the base of transistor 1 on chassis with respect to HF. The emitter terminal 9 of transistor 1 is connected to a junction 9' which, in turn, is connected over a resistor 10 to chassis.

A terminal 11 which is a source of positive voltage is connected over a resistor 12 to a junction joint 24. Junction 24 connects to the anode of a first diode 13 of PIN type, the cathode of which is connected to junction 9'. A second PIN diode 14 connects from junction 9' to a junction point 23. Junction point 23 is connected over resistor 15 to terminal 16 forming the output terminal of the automatic gain control (AGC) circuit of the TV receiver. A capacitor 17 bypasses resistor 15 to ground; the series connection of a resistor 19 and a third PIN-diode 18 is connected between junctions 24 and 23. HF input terminal 21 is connected over capacitor 20 to junction 24. Terminal 11 always is positive with respect to the emitter terminal 9.

If desired, an input matching circuit 25 can be connected in series between terminal 21 and the antenna output terminal 21' of the TV receiver. Further, a filter, bandpass, or a tuned circuit 26 can be placed between junction 9' and emitter terminal 9 (see FIG. 2).

Operation:

The transistor 1 not only operates as an HF, high-frequency amplifier but, being a high-current transistor, additionally provides voltage stabilization properties in the circuit. The voltage at terminal 9 (or 9', respectively) is essentially constant. The control network utilizing PIN-diodes is directly, by means of first and second diodes 13, 14 connected to the emitter 9. If the AGC voltage at terminal 16 is highly positive, current will flow from the second source 11 over resistance 12 and diode 13 to the emitter junction 9'. This reduces the transistor current and the voltage on the emitter will remain constant. Diode 13 is conductive. Diodes 14 and 18 are blocked. The input frequency to be amplified will be transmitted over capacitor 20 and diode 13 with hardly any losses to the emitter of the pre-amplifying transistor.

Let it be assumed that the voltage level, at the emitter junction 9', drops. The voltage difference between the base and the emitter, that is, across resistor 10, will increase. A higher control current (base-emitter current) will flow, thus causing a higher collector-emitter current, therefore raising the emitter voltage level and thereby providing for automatic control effect of the transistor. If the emitter voltage should rise, the reverse relationship will obtain.

If the AGC voltage is very low, that is, has only a very small positive level, a first current will flow from the emitter junction 9' over diode 14 and resistor 15; additionally, a second current will flow from the terminal 11 over resistors 12, 19, diode 18, and resistor 15 into the source of AGC voltage. This causes diodes 14 and 18 to become conductive, and diode 13 will block since the control voltage at its anode becomes low. The resistance of resistor 19 is so selected that is provides for the current distribution which arises upon relative change of voltage levels at terminals 16 and 11.

In the above examples, the operation at very high, or very low AGC have been illustrated. Transition states will arise between these limits, the PIN-diodes acting similarly to controlled ohmic resistors. Various intermediate conditions may arise in which the three PIN-diodes 13, 14, 18 become partially conductive, thus have finite resistances. The transition from block to fully conductive state of the PIN-diodes may be considered as part of a continuous control sequence, that is, as a variation of resistance of the diode is a sense of continuous current controlled resistor variation. The combination of the PIN-diode network in combination with the circuit of an uncontrolled high-current transistor provides for excellent high signal handling capability. In a preferred form, diode 18 can be an ordinary germanium diode which, due to its low threshold voltage, provides for good current distribution, and thus continuous control action. Diode 18 will then have the characteristics of a PIN-diode.

The input matching circuit 25 may include tuned circuits, bandpass circuits, filters, and frequency deviation circuits, as desired, as well as impedance matching circuits. Likewise, tuned circuits 2, 3, together with the circuits coupled to inductance 3 can utilize matching and filtering circuits. Tuned circuits, bandpass circuits and filters connected between junctions 9' and emitter terminal 9 of transistor 1 can be used as desired, so long as the d-c relationships between emitter terminal 9 and junction 9' are maintained, that is, that an essentially no-resistance d-c path is provided between junction 9' and emitter terminal 9.

The pre-amplifier transister has the high frequency connected between base and emitter, so that the base has to be de-coupled to chassis with respect to high frequency. The diode network 2 may utilize two diodes, or, to decrease inductivity, two diodes may be connected in parallel.

Various changes and modifications may be made within the inventive concept.

We claim:

1. Automatic gain controlled (AGC) input stage for tuned radio wave receivers, particularly for transistorized television tuners comprising:

a PIN-diode network (13, 14, 18; 15, 19) including diodes having PIN characteristics and means (16) applying an AGC voltage to said network, a high-frequency pre-amplifier transistor (1) to amplify applied radio wave signals, wherein the base of the high-frequency pre-amplifier transistor is bypassed (8) for high frequency to chassis and connected (4) to a source (5) of bias voltage;

the emitter of the pre-amplifier transistor (1) is connected over a first diode (13) of the diode network to the high-frequency input (21) and a first resistor (10) is provided connecting the emitter to ground;

a second diode (14) of the diode network is provided interconnecting the emitter to a junction (23) and then over a capacitor (17) to ground;

a third diode (18) of the diode network and a second resistor (15) having one terminal each connected to said junction (23) of the second diode (14);

the AGC voltage application means (16) being connected to the other terminal of the second resistor (15);

a source of supply voltage (11) resistively (12) interconnected with the high-frequency input (21) and hence with one terminal of the first diode (13);

and a third resistor (19) interconnecting the high-frequency input (21) and the resistively connected source of supply voltage (11) to the other terminal of the third diode (18), said first, second and third diodes, resistors and capacitors forming the PIN-diode network.

2. Input stage according to claim 1, wherein the third diode (18) in the PIN-diode network is a germanium diode.

3. Input stage according to claim 1, wherein the PIN-diode network comprises at least two PIN-diodes.

4. Input stage according to claim 1, wherein a filter network (26) is interconnected between the PIN-diode network and the pre-amplifier transistor (1).

5. Input stage according to claim 1, wherein a matching network (25) having a variable transfer characteristic interconnected in advance of the PIN-diode network between the input to the PIN-diode network and the high-frequency input.

6. Input stage according to claim 1, wherein the transistor (1) is connected in emitter circuit and the high frequency is connected to the transistor between its base and emitter.

7. Automatic gain controlled (AGC) input stage for tuned radio wave receivers, particularly for transistorized television tuners comprising:

a PIN-diode network (13, 14, 18; 15, 19) including diodes having PIN characteristics and means (16) applying an AGC voltage to said network;

a high-frequency pre-amplifier transistor (1) to amplify applied radio wave signals;

a direct current supply circuit for the high-frequency transistor comprising:

a source (11);

a voltage divider (12, 19, 15) including one PIN diode (18) of the PIN-diode network, the voltage divider having said source (11) connected to one terminal thereof, and the AGC application means (16) to the other terminal thereof;

a second diode (14) connecting a tap point (23) of the voltage divider to the emitter of the transistor (1);

a further diode (13) of the PIN-diode network interconnecting another tap point (24) of the voltage divider and the emitter of the transistor (1);

means (20, 21) coupling high-frequency signals to the voltage divider;

said two tap points (23, 24) being located at opposite terminals of one diode (18) of the voltage divider.

8. Input stage according to claim 7, wherein the means (20, 21) coupling the HF signals to the voltage dividers comprises a coupling capacitor (20) connected to a tap point on said voltage divider.

* * * * *